United States Patent [19]
VanDenberg

[11] Patent Number: 5,505,482
[45] Date of Patent: Apr. 9, 1996

[54] ROAD-RAILER SUSPENSION SYSTEM HAVING A SPRING LIFT AND A STABILIZER BAR

[75] Inventor: Ervin K. VanDenberg, Massillon, Ohio

[73] Assignee: Suspensions Incorporated, Canal Fulton, Ohio

[21] Appl. No.: 295,208

[22] Filed: Aug. 24, 1994

[51] Int. Cl.$^6$ .................................................. B60G 11/28
[52] U.S. Cl. .......................................... 280/704; 280/713
[58] Field of Search .................................... 280/704, 687, 280/683, 678, 685, 684, 713, 711

[56] References Cited

U.S. PATENT DOCUMENTS

| 3,140,880 | 7/1964 | Masser | 280/124 |
| 4,114,923 | 9/1978 | Raidel | 280/711 |
| 4,132,432 | 1/1979 | Raidel | 280/711 |
| 4,309,045 | 1/1982 | Raidel | 280/711 |
| 4,530,515 | 7/1985 | Raidel | 280/704 |
| 5,083,812 | 1/1992 | Wallace et al. | 280/713 |

OTHER PUBLICATIONS

Ridewell, Sure–Trak Forward & Reverse Castering Suspension.

Primary Examiner—Matthew C. Graham
Attorney, Agent, or Firm—Sand & Sebolt

[57] ABSTRACT

A vehicle suspension system having a pair of hanger brackets, with one control arm and one torque arm pivotally mounted on one end to each hanger bracket. Each control arm and each torque arm is pivotally attached to one of a pair of axle seats at another end. One end of a stabilizer bar is mounted to a control arm to increase the suspensions roll stability, and resistance to lateral deflection. The pivotal connections on either end of the control arm include a flexible bushing formed with a hole, and a pivot pin extending through the hole. A lift mechanism includes a compression spring acting against a force plate to move a pair of tire-wheel assemblies between ground engaging and non-ground engaging positions through an interconnected lift bar. The lift mechanism will raise the tire-wheel assembly between a non-ground engaging position, a first ground engaging position, and a second ground engaging position for use in roadrailer applications.

22 Claims, 7 Drawing Sheets

ROAD-RAILER SUSPENSION SYSTEM HAVING A SPRING LIFT AND A STABILIZER BAR

BACKGROUND OF THE INVENTION

1. Technical Field

The invention relates generally to an improved vehicle suspension system. More particularly, the invention relates to air spring suspension systems for land vehicles which include a parallelogram kinematic movement. Specifically, the invention relates to a parallelogram suspension system which is roll stable and resistant to lateral deflection.

2. Background Information

Suspensions are available in the prior art which utilize air springs to provide a comfortable ride, even for large over-the-road trucks and other heavy vehicles. The air springs are typically used in industrial vehicle single axle units, or tandem arrangements of two or more axles which are either driven or non-driven.

One drawback of air spring suspensions is that an air spring is essentially an air inflated bag and requires auxiliary stabilization. An air suspended axle must have separate independent mechanical location and attitude controls and stabilized components or it will not function effectively. Absent stabilization, the air spring will extend to its maximum length or width in the direction of least resistance. Also, lateral loading from cornering or negotiating uneven terrain will cause a vehicle supported on unstable air springs to lean and possibly roll-over.

A significant number of air spring suspensions have been developed which to a greater or lessor extent, control axle location and attitude. A number of suspensions that have been developed are roll rigid, while others are roll flexible, each generally being designed for a specific application. The most common roll rigid configuration is the trailing beam type suspension, most of which use the axle as a torsion rod to provide roll rigidity.

Another type of suspension which has been developed is the parallelogram suspension which is not inherently roll rigid, and does not inherently provide lateral stiffness. Again, ancillary devices such an anti-roll bars, track bars or guide mechanisms have been utilized to stabilize typical parallelogram designs. As such, parallelogram type suspensions, even with the ancillary devices attached, were often only suitable for low center of gravity loads, or on specialized vehicles stabilized by other vehicle suspension mechanisms.

Trailing arm suspensions are brake reactive. That is, when the vehicle brakes are applied, the suspension will tend to compress thereby altering axle loading and potentially reducing the suspension and brake effectiveness. Similarly, when the brakes are applied as the vehicle moves in reverse, the suspension will tend to raise up, and pivot about the single trailing arm pivot, again altering axle loading and reducing the suspension and brake effectiveness. Further, most trailing arm suspensions suffer from dock walk such that they move toward or away from the loading dock as the suspension moves up or down with the brakes locked. This movement is caused from air draining off the air springs, or as a result of loads added to or removed from the vehicle, or the temperature changes that occur as the trailer remains parked by the dock. Dock walk occurs, in part, because between the fully compressed to the fully expanded position of the air spring, the free end of the trailing arm travels a significant linear distance as a result of movement about a single pivot point. As such, with the brakes locked, as they would be while parked at a dock, the tires also rotate with the trailing arm and cause forward and rearward vehicle motion. Similarly, trailing arm suspensions do not utilize the air springs full capacity as the air spring plates are not parallel in extreme operating positions, again as a result of the trailing arm pivoting about a single pivot point. The rear of the air spring is thus fully extended long before the forward part of the air spring.

Parallelogram suspensions were developed to solve a number of the problems associated with trailing arm type suspensions. However, parallelogram suspensions create problems not present in trailing arm type suspensions. Specifically, parallelogram suspensions are not inherently roll rigid nor do they inherently provide lateral stiffness. Parallelogram suspensions have been found to be a significant advancement over the prior art as they provide a relatively stable, safe, and comfortable ride for all types of loads. Some of these parallelogram suspensions are included in U.S. Pat. Nos. 4,114,923, 4,132,432 and 4,309,045.

Advantages of the parallelogram stabilized air spring suspensions include that the air suspended axle in a parallelogram suspension moves thru a very short linear distance and has no rotational motion between the loaded and unloaded positions which reduces the problem of dock walk inherent in trailing arm type suspensions.

Further, the parallelogram stabilized suspension permits the air spring's full capacity to be utilized as the top and bottom air spring plates remain substantially parallel throughout the axle lift operation. Specifically, when the air spring is mounted on a moving link of the parallelogram it allows the utilization of the air springs full lift capability when compared to the typical trailing arm design where the air spring travels in an arc and "fans" open stretching the rearmost internal reinforcing fibers of the spring while not utilizing even the full travel of the forward part of the air spring.

A further advantage of the parallelogram suspension is its inherent ability to maintain a constant caster angle for steerable or caster steering axles which are often utilized in auxiliary axle suspensions for tractors and trailers.

The parallelogram suspension inherently provides the above advantages, and also locates the axle relative to the longitudinal axis of the vehicle by controlling the forward and rearward motions of the axle relative to the frame. Moreover, a parallelogram suspension also controls the path which the air spring follows as it operates to take up irregularities in the road surface. However, the parallelogram suspension alone does not stabilize the air spring. Specifically, the parallelogram itself does not provide lateral stability to the suspension system.

Lateral forces act on a suspension system in a variety of ways with the most common being that lateral forces act on a suspension as the vehicle negotiates a turn. As the vehicle turns, shear stresses act between the tire and the road surface causing a lateral stress to be transferred through the tire-wheel assembly to the axle. The axle, being rigidly attached to the suspension, transfers the lateral forces into the parallelogram causing it to laterally deflect. This lateral deflection can be extreme and substantially limits the usage of parallelogram suspensions. Lateral force may be strong enough under certain loading conditions that the tires contact the vehicle frame rails.

It is thus necessary to provide mechanical means for controlling lateral forces on the suspension and its various members. One typical suspension where lateral forces are mechanically controlled is shown in U.S. Pat. No. 3,140,880 in which air springs are disposed between two vertically swinging control arms to which the axle is also attached. One feature of this suspension is that much of the lateral force is controlled by a strong, relatively rigid attachment between the axle and the control arms. As such, the lateral force is taken up by the attachment between the control arm and the axle. While this prior art suspension system presumably functioned for the purpose for which it was intended, it suffered from dock walk, brake reactivity, and it did not utilize the full lift potential of the air spring. Moreover, it is desirable to provide for greater flexibility between the axle and the control arms, while still maintaining sufficient lateral stability and thus increase the suspensions roll stability. Thus, the second problem inherent in parallelogram air spring suspensions is that they are not roll stable.

Roll instability refers to the lack of sufficient counteracting forces operating on the ends of an axle allowing one end of the axle to raise relative to the frame a distance greater than the other end of the axle. Roll instability is encountered when the vehicle frame tilts or rolls relative to the axle; for example, when the vehicle negotiates a turn such that the centrifugal and acceleration forces reduce the downward forces acting on the inside wheel of the turn, and increase the downward force acting on the outside wheel of the turn. Roll instability can also be realized when the axle moves relative to the frame; for example, during diagonal axle walk.

Diagonal axle walk occurs when the axle moves relative to the vehicle frame which occurs when the wheels at the opposite ends of the axle encounter unlike irregularities in a road or off-the-road surface, such as when one wheel rides over a curb. As the wheel rides over the curb, an upward force acts on that wheel, and a counteracting downward force acts on the wheel not riding over the curb. If the suspension is unable to provide flexibility between the axle and the frame as the tire-wheel assembly travels over the curb or ground irregularity, or alternatively to provide the same resilience or flexibility between the axle and the frame as the vehicle negotiates a turn, the suspension will be too roll rigid, and may cause axle breakage and over-stress vehicle components. Roll rigid suspensions are used to stabilize high center of gravity vehicles like highway trailers, and are most critical in applications such as tank or dump trailers and vans having high volume boxes. In these applications, only enough roll compliance is permitted to allow the axle suspension combination to negotiate uneven terrain without unduly stressing the vehicle frame or axle. Typically, the roll angles of axle to frame are 2 to 3 degrees in roll rigid environments. That is, if all the load were transferred to the tire or tires on one side of the vehicle and the tire or tires on the other side of the vehicle are completely off the ground, the angle of the axle relative to the frame reaches only about 2 to 3 degrees for a typical roll rigid suspension.

Conversely, roll flexible suspensions are used on low height vehicles and multi-axle vehicles which are stabilized by only some of the suspensions and the added axles merely increase the load carrying capacity of the vehicle. In applications where tractive effort is paramount, the suspension must be flexible to allow the tires to remain in contact with the ground. Specifically, if a given suspension is roll flexible, so that the vehicle may have a larger total vehicle weight, the tire must remain in ground contact to assure that weight is transmitted to the ground through the tire.

Regardless of whether a roll rigid or roll flexible suspension is required, the suspension itself must be roll stable for the safety reasons set forth hereinabove.

Attempts have been made to provide additional resistance to lateral forces while simultaneously allowing the frame to "roll" in a controlled manner relative to the axle without interfering with the vertical forces controlled by the air springs. Prior attempts to provide additional roll resistance include the addition of stabilizer bars, roll bars or torsion bars secured between the suspension and the frame, or by stiffening the connection between the axle and the control arm as described above. One such suspension is shown in U.S. Pat. No. 5,083,812.

Such improvements, however, may nevertheless affect the handling and ride of the vehicle, and transfer the load caused by the lateral forces to the frame thereby over-stressing vehicle components. Such systems are frequently more complex, having many moving components, and may also have limited application, especially where the vehicle center of gravity is over a predetermined height.

A roll stable parallelogram suspension which is resistent to lateral forces would have a variety of uses. The parallelogram suspension has not been used in a roadrailer application as the vertical distances the suspension travels magnifies the affect of lateral forces acting on the suspension. In the roadrailer application, the axle must be moved between three separate positions: a first ground engaging position when the roadrailer suspension is operating in highway mode, a second ground engaging position when the trailer is raised to engage a rail bogie in coupling mode, and a rail mode wherein the tires are lifted above the railing. The size of the air spring necessary to move the suspension between these three positions made the use of other parallelogram suspensions unrealistic as the affects of lateral forces and roll instability could not be overcome while trailing beam designs require more airspring travel decreasing ground clearance and increasing cost and weight.

Roadrailer suspensions utilize a lifting mechanism which may either be an air spring, or a mechanical spring of the leaf or coil variety. The conventional axle lifting mechanism comprises one or more stressed mechanical springs such as coil springs or leaf springs acting directly between the vehicle frame and axle. When air is relieved from the air springs, the mechanical springs raise the axle. The mechanical springs, in their condition of diminished stress when the axle is fully raised, must still exert sufficient force to support the weight of the axle and tire-wheel assemblies such that the wheels remain in the raised position. When the air springs are pressurized, the wheels are forced downwardly into ground engagement overcoming the mechanical spring force.

Therefore, a need exists for a road-railer suspension which is parallelogram stabilized and is roll stable, but which is also resistant to lateral forces.

SUMMARY OF THE INVENTION

Objectives of the invention include providing a road-railer suspension system which includes kinematic parallelogram movement.

Another objective is to provide a parallelogram road-railer suspension which is resistant to lateral forces.

A further objective is to provide a parallelogram type road-railer suspension which is roll stable.

Yet another objective is to provide a parallelogram air spring suspension which will operate equally well on most vehicles.

A still further objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved road-railer suspension system, the general nature of which may be stated as including a pair of parallel and spaced apart parallelogram means for at least partially stabilizing an axle relative to a frame and adapted to extend between an axle and a frame; spring means for resiliently controlling the vertical movement of an axle relative to a frame adapted to extend between a frame and an axle; a stabilizer bar having a first end and a second end extending between said pair of parallelogram means; mounting means for mounting one of said first and second ends to each parallelogram means; and a pair of axle lift means for moving the axle between a ground engaging and a non-ground engaging position.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 4A is a fragmentary perspective view of a control arm, shown in partial section;

Similar numerals refer to similar parts throughout the drawings.

DESCRIPTION OF THE PREFERRED EMBODIMENT

Figure 1:
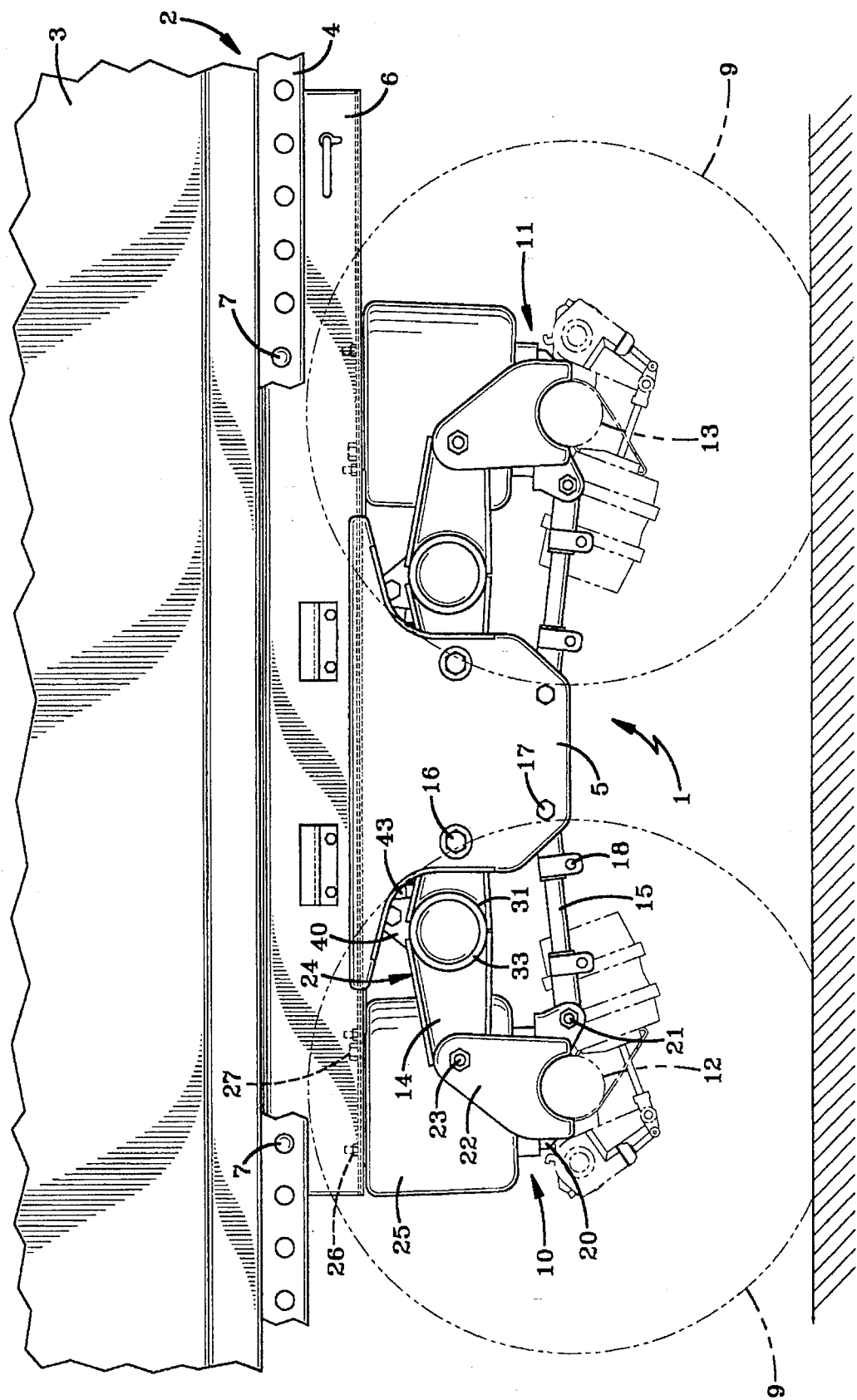
FIG. 1 is a side elevational view of the vehicle suspension system with the tires and brake assemblies shown in dot-dash lines attached to a vehicle.
Figure 2:
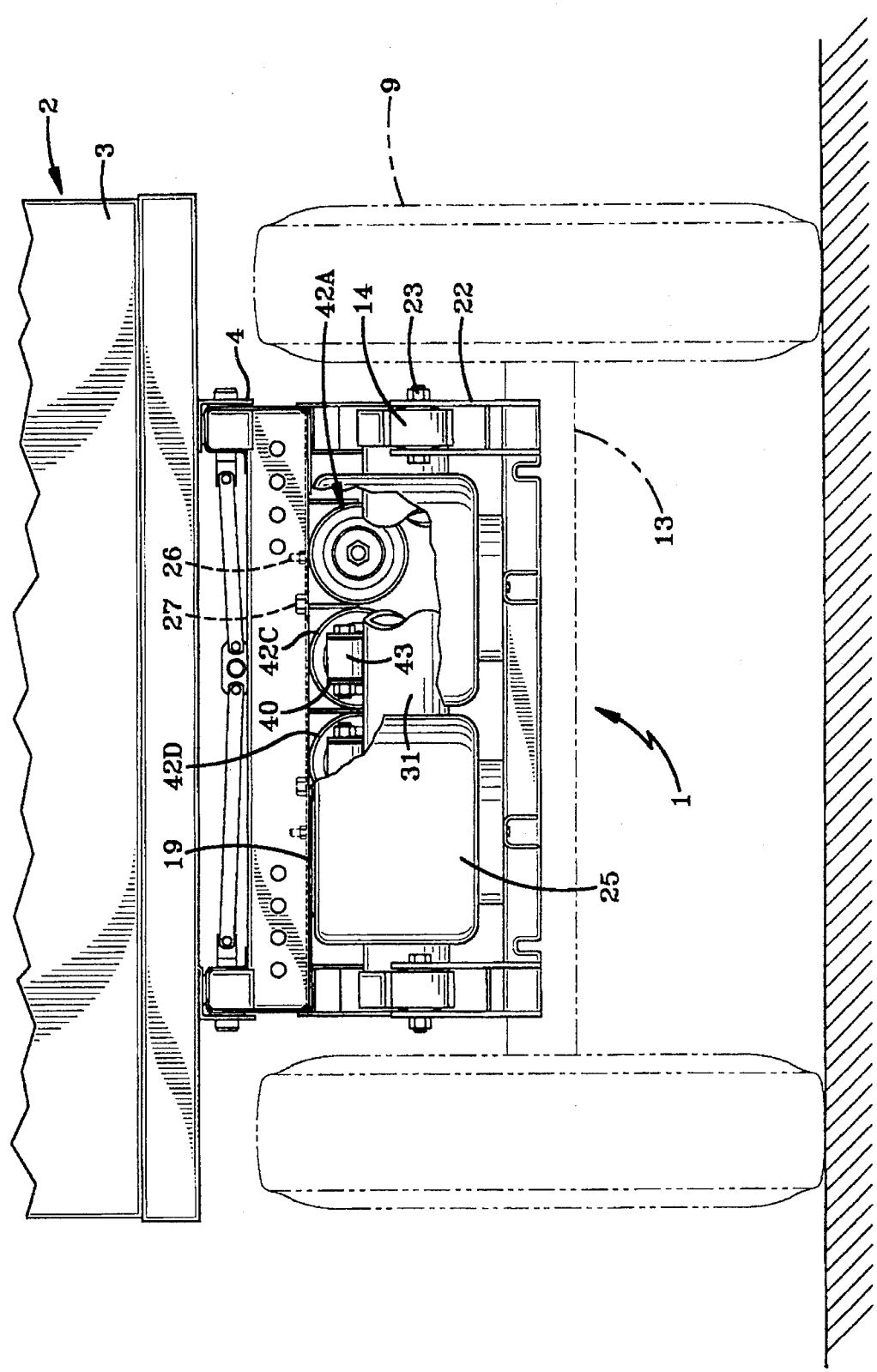
FIG. 2 is a rear elevational view of the vehicle suspension system shown in FIG. 1 with portions broken away.
Figure 3:
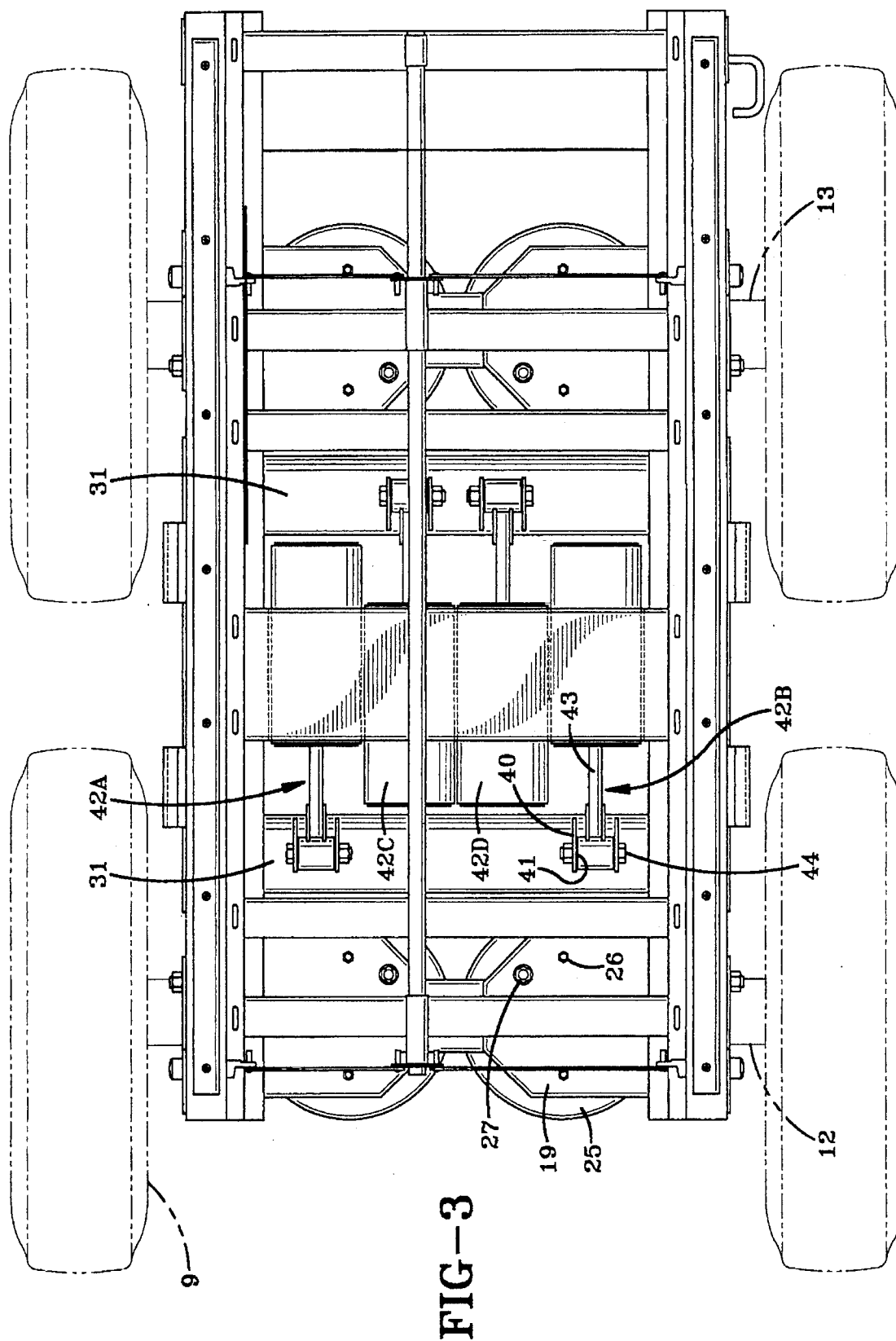
FIG. 3 is a top plan view of the suspension system shown in FIG. 1.

The improved vehicle suspension system of the present invention is indicated generally at 1, and is particularly shown in FIGS. 1, 2 and 3, and is particularly adapted to be mounted on a vehicle 2, such as a truck or trailer. Vehicle 2 includes a cargo box 3 supported by a pair of frame rails 4 extending longitudinally along the length of vehicle 2. Suspension system 1 includes a pair of hanger brackets 5 welded to a pair of parallel and spaced-apart slide channels 6. Slide channels 6 are spaced apart a distance equal to the distance between frame rails 4 and are mounted to frame rails 4 with a plurality of mounting bolts 7. Suspension system 1 further includes a forward suspension 10 and a rearward suspension 11 for supporting a forward axle 12 and a rearward axle 13, respectively. Each axle 12 and 13 supports a tire-wheel assembly 9 at each end thereof.

Inasmuch as both the forward and rearward suspensions 10 and 11 are similar, with the forward suspension 10 being merely reversed from the rearward suspension 11 with respect to hanger bracket 5, only forward suspension 10 will be described in detail. Forward suspension 10 includes a pair of parallel and spaced apart control arms 14, and a pair of parallel and spaced apart torque arms 15 pivotally mounted to respective hanger brackets 5 at corresponding pivots 16 and 17. The length of each torque arm 15 may be adjusted via threaded adjustment nuts 18 in a manner well known in the art. The ends of each control arm 14 (FIG. 4) include a mounting boss 35 integrally formed with a hole 36.

Forward suspension 10 further includes a pair of spaced-apart axle seats 20 from which axle 12 depends. Each torque arm 15 connects to a corresponding axle seat 20 at a pivot 21. An axle seat weldment 22 depends from each axle seat 20 and one control arm 14 attaches to each axle seat weldment 22 at a pivot 23. One hanger bracket 5, control arm 14, torque arm 15 and axle seat weldment 22, thus form a kinematic parallelogram indicated generally at 24 in FIG. 1.

An air spring 25 is mounted between each axle seat 20 and a spring mounting plate 19 adjacent a slide channel 6 by any convenient attachment means such as bolts 26, shown in FIGS. 1 and 3. Moreover, an air nozzle 27 is provided in each air spring 25 to inflate the air spring in a manner well known in the art.

In accordance with one of the main features of the present invention, each pivot 16 and 23 (FIG. 4) includes a flexible rubber bushing 28 formed with a hole 29. Rubber bushing 28 is bonded to an inner sleeve 28A which is press-fit within a hole 36 that is formed in each mounting boss 35 of control arm 14. Pivots 16 and 23 also include a pivot pin 30 which is fitted into inner sleeve 28A in hole 29 of flexible bushing 28 and clamps the ends of inner sleeve 28A to prevent rotation of pin 30 within sleeve 28A. Inasmuch as a pivot pin 30 is fitted into each bushing 28, and each bushing 28 is press-fit into control arm 14, any movement between control arm 14 and pivot pins 30 occurs as a result of distortion in flexible bushings 28. Bushings 28 provide relatively little lateral deflection in the range of 0.12 inches to 0.25 inches. Pivots 17 and 21 are also fitted with bushings (FIG. 4).

Alternatively, a bearing 65 (FIG. 4A) may be press-fit into each flexible bushing 28, and pivot pin 30 may be slip-fitted into the bearing to provide movement between bushing 28 and pivot pin 30 thereby reducing the stress on bushing 28.

Figure 4:
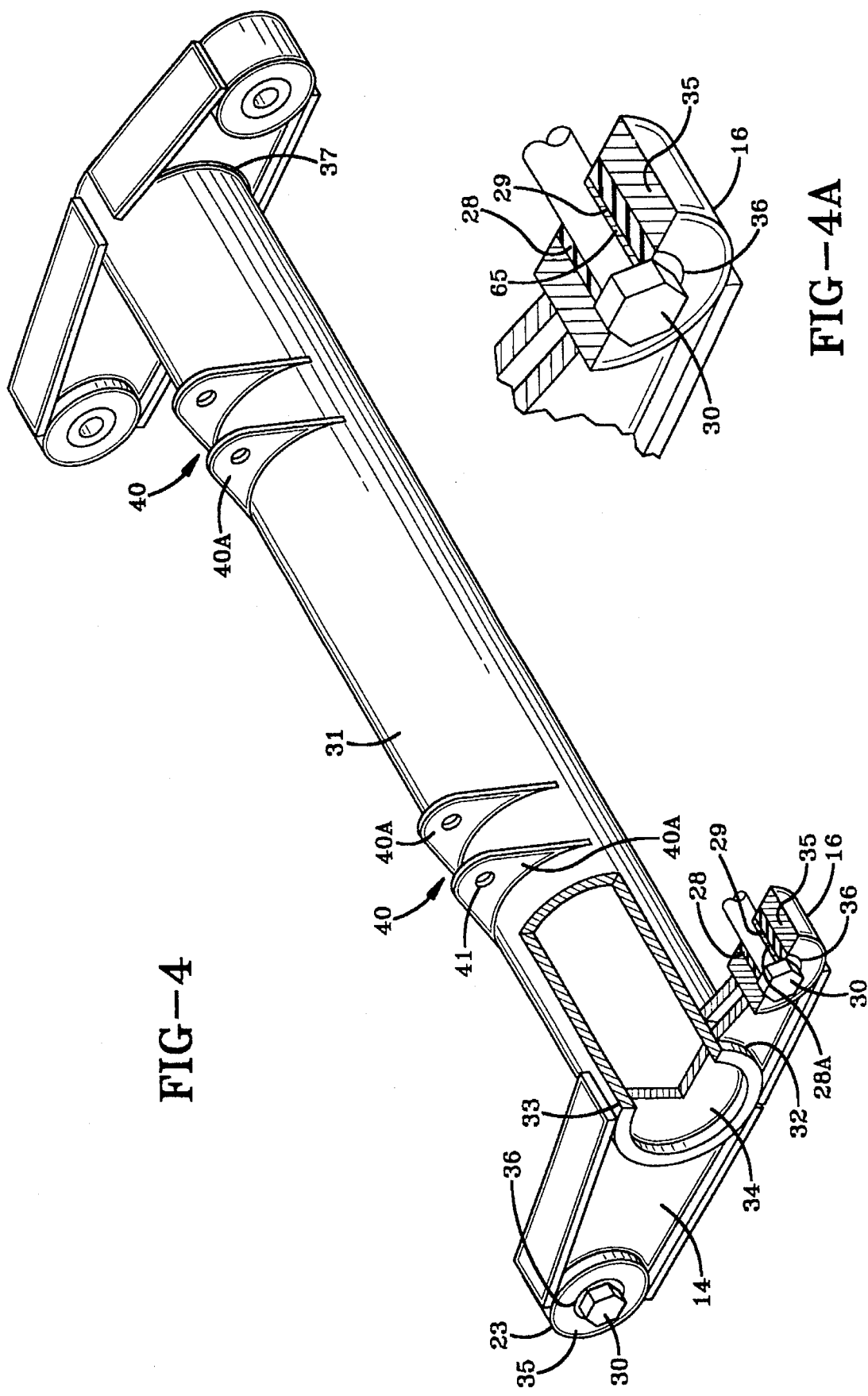
FIG. 4 is a perspective view of the control arms and stabilizer bar of the invention with one of the control arms and the stabilizer bar shown in partial section.

In accordance with another of the main features of the invention, a tubular stabilizer bar 31 extends between spaced apart control arms 14, and is normal to slide channels 6 and is formed with a pair of ends 33 (FIG. 4). Each control arm 14 is formed with a through hole 32 which accepts one end 33 of stabilizer bar 31 and is capped with a cover plate 34. A weld 37 extends around stabilizer bar 31 adjacent each hole 32. Bushings 28 and stabilizer bar 31 combine to provide a roll stable suspension resistant to lateral deflection as is described in more detail below.

Two pairs of spaced apart mounting brackets 40 extend from stabilizer bar 31 (FIG. 4). Each pair of mounting brackets 40 includes two brackets 40A which are formed with through mounting holes 41. Each pair of mounting brackets 40 of forward suspension 10 is part of a respective outer lifting mechanism, indicated generally at 42A and 42B in FIGS. 1–4, which are collectively referred to as 42. Each lifting mechanism 42 also includes a lift bar 43 pivotally coupled at one end to a corresponding pair of mounting brackets 40 by passing a bolt 44 through mounting holes 41 and lift bar 43. An opposing end of each lift bar 43 is received through an aperture 45 (FIGS. 9–11) formed in the center of a spring cup 46 and is secured to spring cup 46 with an adjustment nut 47, a washer 48 and a bushing 49. Each spring cup 46 includes a peripheral flange 50 and an integral cup-shaped central portion 51. Each spring cup 45 and each lift bar 43 is mounted within a tubular housing 52 (FIGS. 2, 3).

Figure 5:
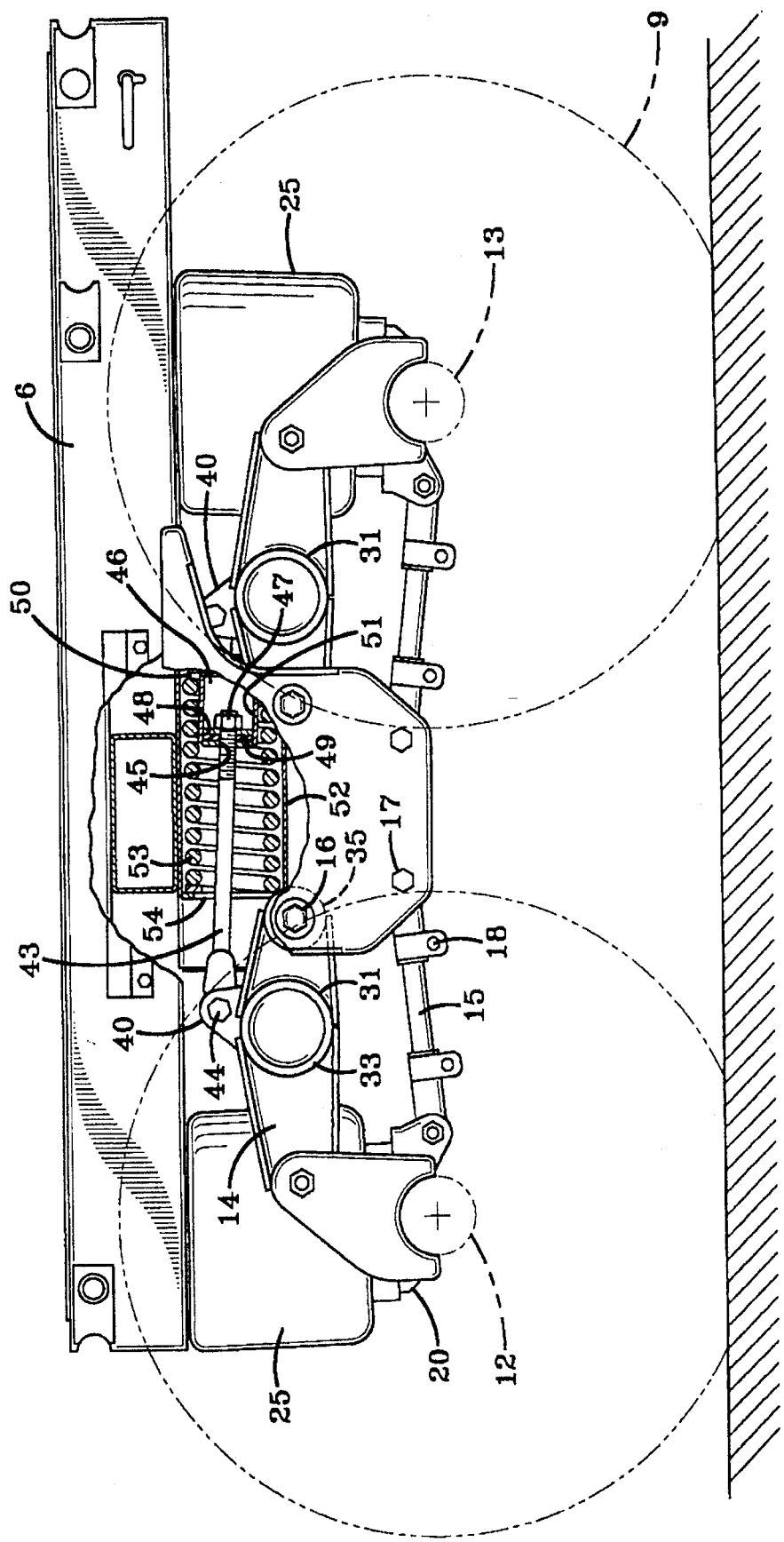
FIG. 5 is a side elevational view of the suspension of the present invention shown in the highway mode, with portions broken away and in section, and with the tires in dot-dash lines.
Figure 6:
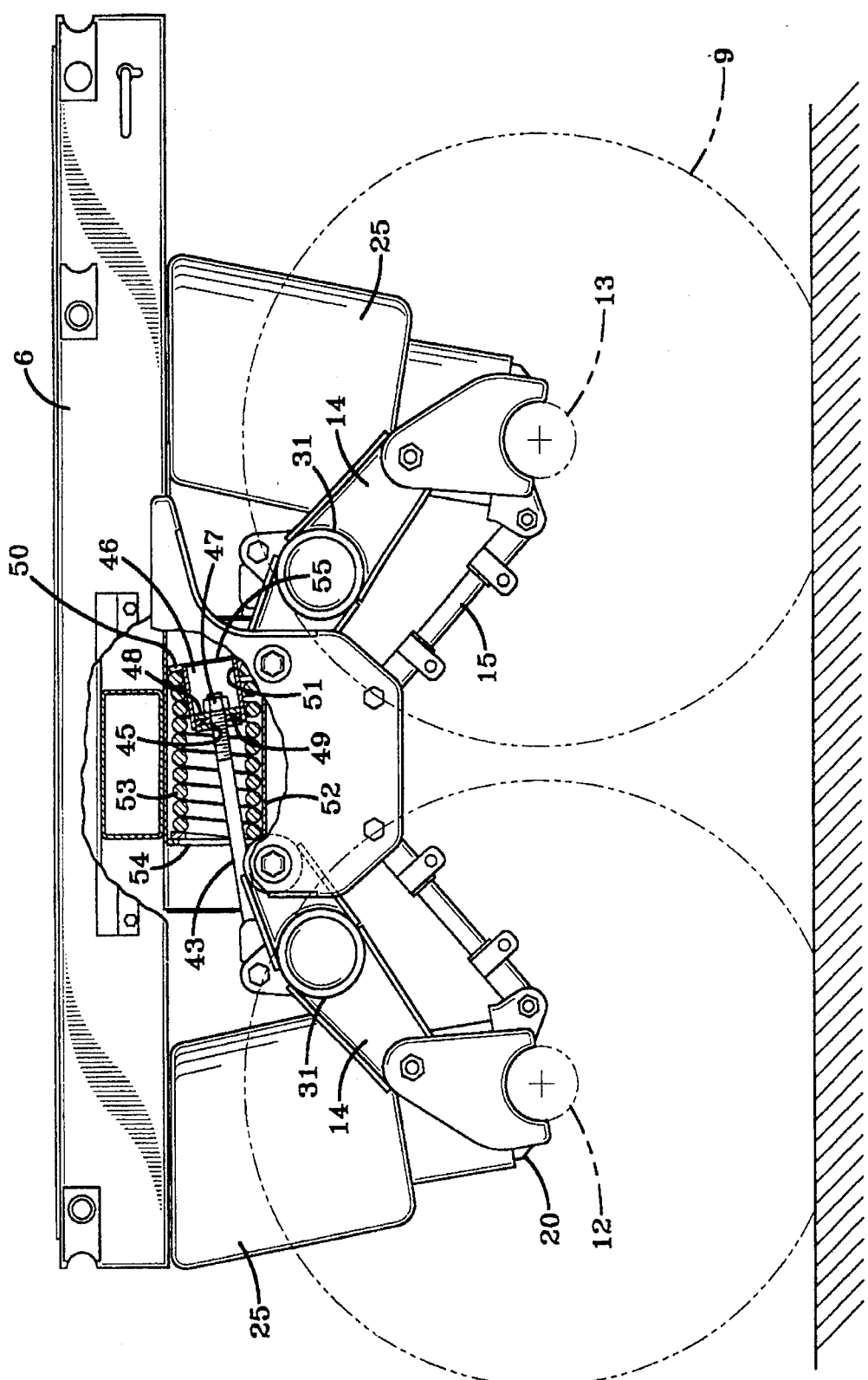
FIG. 6 is a side elevational view of the suspension of FIG. 1 in the coupling mode.
Figure 7:
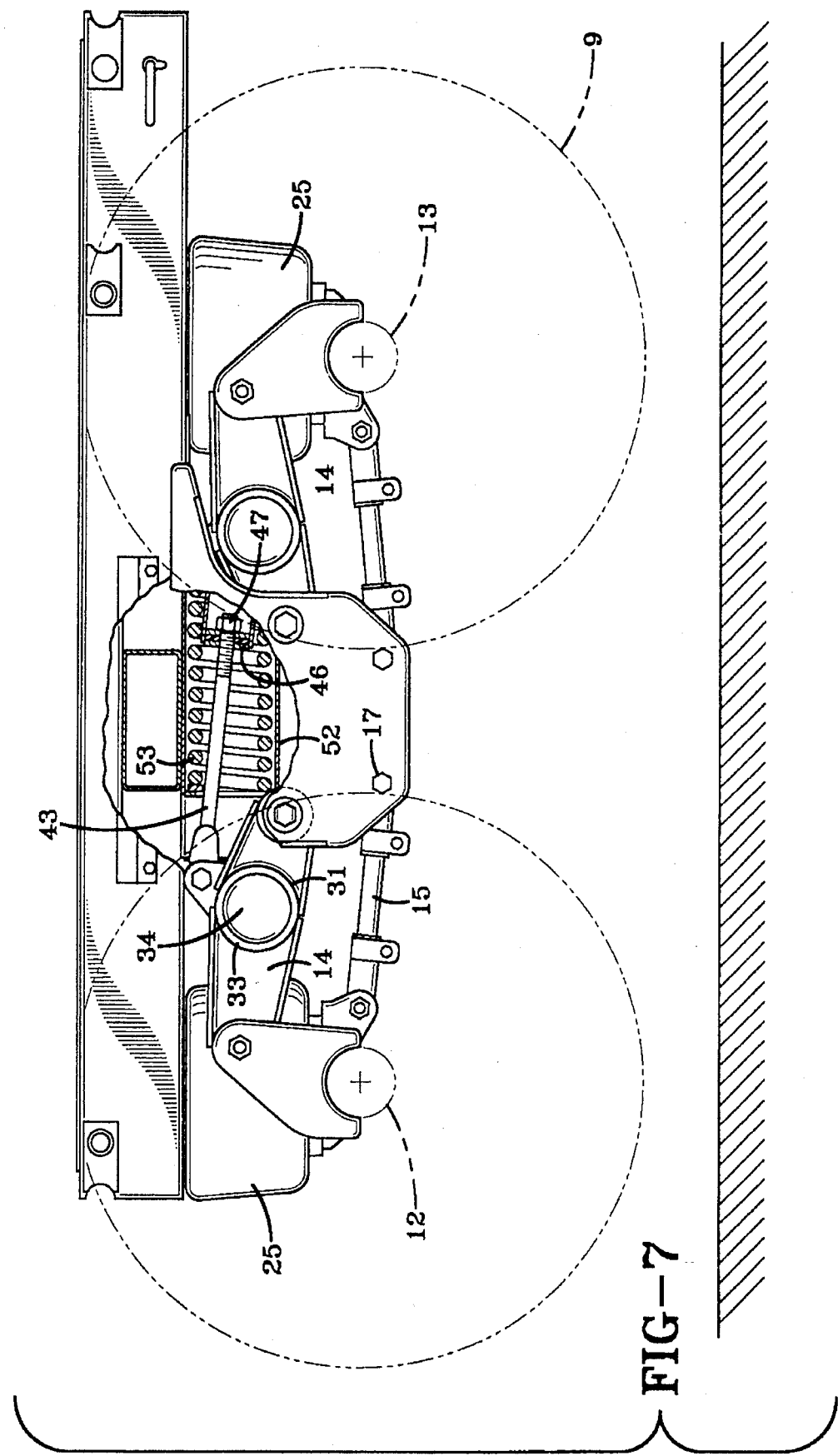
FIG. 7 is a side elevational view of the suspension of FIG. 1 in the raised position.

Each lifting mechanism 42 also includes a compression spring 53 mounted within housing 52 (FIGS. 5–6). One end of spring 53 abuts peripheral flange 50 of spring cup 46, while the other end of spring 53 bears against a force plate 54 of tubular housing 52. Tension forces exerted on spring cup 46 may be varied by adjusting the axial location of adjustment nut 47 along lift bar 43. Tubular housing 52 includes a cover plate 55 extending over the spring cup 46, with a hole being formed therein to provide access to adjustment nut 47.

As discussed above, two lift mechanisms 42 are provided to lift forward axle 12. Referring specifically to FIG. 4, forward axle 12 is raised and lowered via the outer lift mechanisms 42A and 42B. Similarly, the rearward axle 13 is raised and lowered via the operation of the inner lift mechanisms 42C and 42D.

As apparent to one of ordinary skill in the art, forward suspension 10 may be utilized when only a single axle vehicle suspension system 1 is required. However, if tandem axle arrangements are required, for example those arrangements utilized on known trailer vehicles, a forward suspension 10 is utilized in combination with rearward suspension 11 as shown specifically in FIG. 1. Rearward suspension 11 is reversed from forward suspension 10 with respect to hanger bracket 5. In this manner, the overall length of the tandem unit may be significantly reduced when compared to standard tandem trailing arm suspensions which cannot be reversed, and existing parallelogram suspensions wherein the rearward suspension 11 is not reversed. In the exemplary embodiment, the overall tandem arrangement has a length in the range of 60 to 70 inches.

Having now described the improved vehicle suspension system 1, the method of operation is as follows.

When vehicle 2 is moving in a straight line and tire-wheel assemblies 9 at opposite sides of vehicle 2, roll over similar irregularities, there is no significant differential vertical movement between the respective parallelograms 24 supporting axle 12. Forces in suspension system 1 are controlled primarily by air springs 25, with minor lateral forces being controlled by pivots 16, 17, 21 and between the members of parallelogram 24.

However, the forces act differently on suspension system 1 when vehicle 2 encounters road conditions which cause differential vertical swinging of control arms 14 attached to common axle 12. Differential vertical swinging of control arm 14 occurs when vehicle 2 negotiates a turn or when one tire-wheel assembly 9 traverse a bump or depression while the opposite tire-wheel assembly 9 passes over an unlike surface. Absent stabilizer bar 31, pivotal connections 16, 17, 21 and 23 would not provide sufficient roll stability for the vehicle. Stabilizer bar 31 increases roll stability by resisting the tendency of parallelogram 24 to roll relative to frame rails 4. When vehicle 2 traverses an irregularity in the road, the force from the irregularity will cause one tire-wheel assembly 9 to raise toward the vehicle. As tire-wheel assembly 9 raises, one parallelogram 24 will pivot upwardly and will transmit force to the opposing parallelogram 24, causing a downward force to act thereon. The associated movement of respective control arms 14 will twist stabilizer bar 31 in torsion which will resist the twisting. Consequently, stabilizer bar 31 resists the displacement of control arms 14 to increase the roll stability of vehicle 2.

Similarly, as vehicle 2 negotiates a turn, cargo box 3 will tend to rotate out of the turn applying opposite forces on the suspension which will similarly apply torsion to stabilizer bar 31, thereby resisting the rotation of the cargo box relative to the ground surface.

Lateral forces also act on suspension system 1 when vehicle 2 negotiates a turn which will tend to deflect the parallelogram in a horizontal direction transversely with respect to frame rails 4 which distorts control arms 14 and torque arms 15 out of the usual planar configuration. Parallelogram 24 offers little resistance to lateral deflection with the only resistance being offered by flexible bushings 28 at pivots 16, 17, 21 and 23. Stabilizer bar 31 primarily resists this movement in the improved suspension. Specifically, as the vehicle negotiates a turn, the lateral forces will cause each parallelogram 24 positioned on opposite sides of the axle to distort, applying a moment to each end of stabilizer bar 31 which is rigidly attached to control arms 14. The amount of lateral deflection permitted by stabilizer bar 31 is directly proportional to its modulus and size. As such, when lateral forces act on suspension system 1, a portion of stabilizer bar 31 is in tension and a portion is in compression, urging stabilizer bar 31 to assume a sinusoidal configuration.

Regarding the operation of lifting mechanism 42, and referring specifically to FIGS. 3, 10 and 11, compression spring 53 is sufficiently prestressed to move axle 12 and tire-wheel assembly 9 to the lifted position and retain the same in the lifted position. More particularly, when air spring 25 is deflated, compression spring 53 will push against force plate 54 and move stabilizer bar 31, interconnected axle 12 and tire-wheel assembly 9 to the raised position. Compression spring 53 provides the lifting force when it expands against force plate 54 to move spring cup 46, which in turn moves interconnected lift bar 43. The force translated through lift bar 43 is transferred to stabilizer bar 31, to move axle 12 to the position shown in FIG. 11.

When it is desired to transmit load to tire-wheel assemblies 9, air springs 25 are inflated to exert downward force on stabilizer bar 31. Air springs 25 inflate to exert force on axle 12, and consequently on lift bar 43. This force is sufficient to overcome the counteracting forces exerted by compression spring 53, and as air springs 25 push down on axle 12, interconnected stabilizer bar 31 will also move downwardly, pulling pivotally attached lift bars 43 to the ground engaging position. As each lift bar 43 moves downwardly, it will pull against an associated spring cup 46 to compress spring 53 against force plate 54, and suspension system 1 moves to a first lowered position shown in FIG. 9. When air spring 25 is inflated to the first lowered position, or highway mode, only a portion of the air spring overall effective length is utilized, and tire-wheel assemblies 9 are spaced sufficiently far from frame rails 4 to allow vehicle to comfortably ride over the road surface.

When air springs 25 are fully inflated, they exert a sufficient force on axle 12 to overcome the counteracting forces exerted by compression springs 53, and stabilizer bar 31 is moved to a second lowered position, or coupling mode, shown specifically in FIG. 10. Each lift bar 43 thus pivots at mounting brackets 40 to further compress spring 53 by applying a force to spring cup 46. Suspension system 1 is placed in the coupling mode shown in FIG. 10 when vehicle 2 is being coupled to a rail bogie. After coupling, air springs 25 are fully deflated to move vehicle suspension system 1 to the position shown in FIG. 11, thereby moving tire-wheel assemblies 9 out of ground engaging contact. After vehicle 2 has been transported via the railroad bogie, air springs 25 are reinflated to move suspension system 1 to the position shown in FIG. 10. Vehicle 2 is then pulled away from the rail bogie, with the air springs then being partially deflated to the highway mode position shown in FIG. 9, for ground engaging contact to be pulled by a known tractor vehicle.

Vehicle suspension system 1 provides a parallelogram axle 12 with all the advantages known in the art, while still providing a suspension that is resistent to lateral forces and is roll stable. Parallelogram 24 operates such that as tire-wheel assemblies 9 move into and out of a ground engaging position, control arm 14 and torque arm 15 pivot in unison to maintain a constant caster angle. Similarly, inasmuch as axle 12 moves only a short distance axially and rotationally between the lifted and non-lifted positions, vehicle suspension system 1 will substantially reduce dock walk. Further, inasmuch as the pitch of axle 12 is maintained relative to the vehicle, and the axle travels a short axial distance relative to the frame rails, substantially the entire lift capacity of air spring 25 is utilized. Stabilizer bar 31 enhances the lateral stability and roll stability of the parallelogram stabilized suspension.

Accordingly, the invention described hereinabove, successfully overcome problems associated in the art, and create a parallelogram suspension, as well as a roll stable suspension. Moreover, the suspension system of the present invention also provides an air ride suspension system which is resistant to lateral deflection. Still further, the suspension system of the present invention provides a parallelogram lift suspension which is movable between a non-ground engaging position, a first ground engaging position, and a second lowered ground engaging position for utilization on a roadrailer vehicle. The parallelogram roadrailer suspension essentially utilizes the entire useful length of air springs 25 and the caster angle remains almost constant in both the non-ground engaging position, and the first and second ground engaging positions.

Accordingly, the improved vehicle suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vehicle suspension system is constructed and used, the characteristics of the construction, and the advantageous, new and useful results obtained; the new and useful structures, devices, elements, arrangements, parts and combinations, are set forth in the appended claims.

I claim:

1. A vehicle suspension system for use with a vehicle having a frame and an axle comprising:

a pair of parallel and spaced apart parallelogram means each formed with a hanger bracket adapted to depend from the frame, for at least partially stabilizing the axle relative to the frame and adapted to extend between the axle and the frame;

spring means for resiliently controlling the vertical movement of the axle relative to the frame adapted to extend between the frame and the axle;

a stabilizer bar having a first end and a second end mounted between said pair of parallelogram means and intermediate the hanger bracket and the axle; and a pair of axle lift means including at least one coil spring for moving the axle between a first tire-wheel assembly ground engaging position and a non-ground engaging position.

2. A suspension system as defined in claim 1 in which the spring means is a pair of air springs.

3. A suspension system as defined in claim 1 in which the stabilizer bar is a hollow tube.

4. A suspension system as defined in claim 1 in which each parallelogram means includes a control arm; and in which one of the first and second ends of the stabilizer bar is mounted to the control arm of one of the pairs of parallelogram means.

5. A suspension system as defined in claim 4 in which each control arm is formed with a through hole; and in which each of said ends of the stabilizer bar extends through a respective through hole of the control arm.

6. A suspension system as defined in claim 5 in which a weld secures each of the control arms to the stabilizer bar.

7. A vehicle suspension system for use with a vehicle having a frame and an axle comprising:

a pair of parallel and spaced apart parallelogram means for at least partially stabilizing the axle relative to the frame and adapted to extend between the axle and the frame;

each parallelogram means including a hanger bracket adapted to depend from the frame, a control arm having a first end and a second end, a first pivot means for mounting the first end of the control arm to the hanger bracket, an axle seat including an axle seat weldment, a second pivot means for pivotally attaching said second end of the control arm to the axle seat weldment, a torque arm having a first end and a second end, a third pivot means for pivotally attaching the second end of the torque arm to the axle seat, and fourth pivot means for pivotally attaching the first end of the torque arm to the hanger bracket;

spring means for resiliently controlling the vertical movement of the axle relative to the frame adapted to extend between the frame and the axle;

a stabilizer bar having a first end and a second end mounted between said pair of parallelogram means; and a pair of axle lift means for moving the axle between a first tire-wheel assembly ground engaging position and a non-ground engaging position.

8. A suspension system as defined in claim 7 in which each control arm includes a pair of mounting bosses integrally formed with the control arm; and in which each mounting boss is formed with a hole.

9. A suspension system as defined in claim 8 in which each of the first pivot means and the second pivot means includes a flexible bushing press-fitted into the hole of each mounting boss whereby deflection of said flexible bushings provides the only rotational movement between the hanger bracket and axle seat weldments, and the control arm.

10. A suspension system as defined in claim 8 in which each of the first and second pivot means includes a flexible bushing press-fitted into the hole of each mounting boss; in which a pivot pin is slip-fitted into each bushing such that rotational movement is provided between each pivot pin and bushing as the parallelogram means moves between the first tire wheel assembly ground engaging position and a non-ground engaging position.

11. A suspension system as defined in claim 10 in which a bearing is circumferentially interposed between each flexible bushing and a corresponding pivot pin.

12. A suspension system as defined in claim 7 in which each of the first pivot means and the second pivot means includes a flexible bushing press-fitted into the hole of each mounting boss; in which a pivot pin is interferencely fitted into the hole of at least one bushing such that the deflection of said at least one flexible bushing provides the only rotational movement between the mounting boss and the pivot pin; and in which a pivot pin is slip-fitted into at least one other flexible bushing to provide rotational movement between the corresponding one other flexible bushing and pivot pin.

13. A suspension system as defined in claim 12 in which a bearing is interposed between said at least one other flexible bushing and corresponding pivot pin.

14. A vehicle suspension system for use with a vehicle having a frame and an axle comprising:

a pair of parallel and spaced apart parallelogram means for at least partially stabilizing the axle relative to the frame and adapted to extend between the axle and the frame;

spring means for resiliently controlling the vertical movement of the axle relative to the frame adapted to extend between the frame and the axle;

a stabilizer bar having a first end and a second end mounted between said pair of parallelogram means;

a pair of axle lift means for moving the axle between a first tire-wheel assembly ground engaging position and a non-ground engaging position; and each axle lift means is formed with a force plate rigidly attached to the frame, a spring cup, a coil spring having a first end and a second end, the first end of the coil spring bearing against said force plate and the second end of the coil spring bearing against said spring cup, and a lift bar attached to said spring cup such that said coil spring is adapted to move an axle between the tire-wheel assembly ground engaging and non-ground engaging positions.

15. A suspension system as defined in claim 14 in which the lift bar extends at least partially through the coil spring; and in Which a first end of the lift bar is attached to the spring cup and a second end of the lift bar is movably attached to the stabilizer bar for providing movement between said lift bar and said stabilizer bar.

16. A suspension system as defined in claim 14 in which the spring means includes an air spring operatively engaged with the parallelogram means; and in which the air spring is fully inflated when the axle is in the first tire-wheel assembly ground engaging position, is partially inflated for moving the axle to a second tire-wheel assembly ground engaging position, and is substantially deflated for moving the axle to the non-ground engaging position.

17. A vehicle suspension system for use with a vehicle having a frame and an axle comprising:

a pair of parallel and spaced apart parallelogram means for at least partially stabilizing the axle relative to the frame and adapted to extend between the vehicle frame and the axle;

each of the parallelogram means including a hanger bracket adapted to depend from the frame, a control arm having a first end and a second end, a first pivot means for mounting the first end of the control arm to the hanger bracket, an axle seat including an axle seat weldment, second pivot means for pivotally attaching said second end of the control arm to the axle seat weldment, a torque arm having a first end and a second end, a third pivot means for pivotally attaching the second end of each torque arm to an axle seat and fourth pivot means for pivotally attaching the first end of the torque arm to the hanger bracket;

a pair of spring means for resiliently controlling the vertical movement of the axle relative to the frame adapted to extend between the frame and the axle; and axle lift means for moving the axle between a tire-wheel assembly ground engaging position and a non-ground engaging position.

18. A suspension system as defined in claim 17 in which each control arm includes a pair of mounting bosses integrally formed with the control arm; and in which each mounting boss is formed with a hole.

19. A suspension system as defined in claim 17 in which each axle lift means includes a force plate rigidly attached to the frame; a spring cup; a coil spring having a first end and a second end, the first end of the coil spring bearing against said force plate and the second end of said coil spring bearing against said spring cup; and a lift bar attached to said spring cup such that said coil spring is adapted to move an axle between the tire-wheel assembly ground engaging and non-ground engaging positions.

20. A suspension system as defined in claim 19 in which the lift bar extends at least partially through the coil spring, and in which a first end of the lift bar is attached to the spring cup and a second end of the lift bar is movably attached to the parallelogram means for providing movement between said lift bar and said parallelogram means.

21. A suspension system as defined in claim 20 further includes a pair of brackets attached to said parallelogram means, and in which a bolt extends through the brackets and said second end of said lift bar to provide movement therebetween.

22. A suspension system as defined in claim 21 in which the spring means includes an air spring operatively engaged with the parallelogram means; and in which the air spring is fully inflated when the axle is in the first tire-wheel assembly ground engaging position, is partially inflated for moving the axle to a second tire-wheel assembly ground engaging position, and is substantially deflated for moving the axle to the non-ground engaging position.

* * * * *